Nov. 10, 1970    W. R. E. STEDTNITZ    3,539,978
DIGITAL SHORT-INTERVAL RANGING APPARATUS
Filed Oct. 18, 1968    4 Sheets-Sheet 3

Fig. 11

| J | K | Q | Q̄ |
|---|---|---|---|
| 0 | 0 | Q | Q̄ |
| 0 | L | O | L |
| L | O | L | O |
| L | L | Q̄ | Q |
| PRESET | | L | O |

Inventor:
Wolfgang Richard Ernst Stedtnitz
BY Spencer & Kaye
Attorneys

3,539,978
Patented Nov. 10, 1970

3,539,978
DIGITAL SHORT-INTERVAL RANGING APPARATUS
Wolfgang R. E. Stedtnitz, Bremen, Germany, assignor to Fried Krupp Gesellschaft mit beschrankter Haftung, Essen, Germany
Filed Oct. 18, 1968, Ser. No. 768,765
Claims priority, application Germany, Oct. 18, 1967, 1,673,817
Int. Cl. G01s 9/68
U.S. Cl. 340—3    9 Claims

ABSTRACT OF THE DISCLOSURE

Digital distance measuring apparatus in which erroneous distance indicating read-outs are avoided by comparing the digital value derived for one measuring period with a digital value representing at least one adjacent measuring period to determine whether the two digital values are substantially equal, within a predetermined tolerance range, before transferring the digital value corresponding to the one measuring period to an output device.

BACKGROUND OF THE INVENTION

The present invention relates to an apparatus for digital short-interval ranging, particularly for determining distances by the reflection of electromagnetic, including light, or acoustic pulses.

Since, in a digital determination of a time interval, only one single return pulse can be effective during one measuring period, it is particularly important to eliminate the adverse effects of extraneous pulses. For this purpose it is possible to provide means which serve to suppress interfering pulses as much as possible.

Echo sounding instruments are known which contain a blocking member which blocks the stop channel of the digital counter for all incoming pulses during a presettable time period. An incoming echo controls the time of this "adjustable blocking period" for the next succeeding echo scanning so that it can also be called a follower block which is arranged to cease blocking for a short time just before the expected arrival of the next echo. This, however, brings about the danger that the follower block will become associated, under certain circumstances, to the so-called second echo with the result that only the second echo will subsequently be evaluated, whereas the true echo occurs during the blocking period of the receiver and remains there.

In addition, in the known devices, in spite of measures employed for the suppression of interfering pulses ahead of the actual digital counting stage, interfering pulses will occasionally reach the digital counter and thus cause errors. When using a digital counter there also is the danger that occasional echo losses, which result, for example, from undesirable damping along the transmission path, also lead to erroneous measurements by the digital counter.

SUMMARY OF THE INVENTION

It is a primary object of the present invention to overcome these drawbacks and difficulties.

Another object of the invention is to eliminate the adverse effect on the counting operation of extraneous pulses which reach the digital counting stage.

Yet another object of the invention is to prevent erroneous readings due to second echos and echo losses.

Still another object of the invention is to substantially increase the accuracy of such digital distance measuring devices.

To achieve these objects, the present invention begins with the consideration that interfering or extraneous pulses can also be eliminated in short-interval ranging with digital indication by causing such interfering pulses arriving at the digital counter, which can thus cause erroneous indications by the digital counter, to block the read out of the digital counter.

In order to thus eliminate occasionally occurring erroneous measurements caused by interfering pulses, or by the absence of useful pulses, or by erroneous measurements from continued response to the second echo, the present invention provides, in range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, novel structure for preventing erroneous distance indications. This structure essentially includes difference determining means associated with the counter for determining the difference between the count which it reaches during one measuring interval and the count occurring during a different interval, and limit value logic means for permitting the transfer of the count reached by the counter to an output store only when such difference is within a predetermined tolerance range.

Embodiments of the present invention preferably include a temporary storage device to which the counter output is transferred at the end of a given measuring period and whose stored value is compared, in the difference determining means, with the count produced by the counter during the next succeeding measuring period.

A device constructed according to the present invention permits the probability of the occurrence of erroneous measurements to be substantially reduced.

In particular, the continued response to second echoes cannot happen with the arrangement according to the present invention. During each sounding, the bottom echo can be distinguished. Even if it should happen that the second echo for any arbitarary multiple echo, has stopped the counting process during the next measuring interval, the actual bottom echo can again be discerned as planned. A comparison with the previously derived ditigal value, which thus would have to be called an erroneous measurement, would only lead to a reduction in the normal rate at which transferable counts are produced without a wrong value being read out.

The forming of a difference, according to the present invention, from the derived digital values and the subsequent performance of the evaluation logic operation to control the indication occurring at the output of the digital counting instrument substantially reduce the probability of an erroneous indication.

A number of combinations of digital counter and digital store are possible. Thus, the temporary store can be constructed in the form of a digital counter and the counting pulse input can be switched, from measuring interval to measuring interval, from one to the other digital counter, each digital counter retaining its measuring value until the end of the subsequent measuring interval.

The digital counter can also be associated with a standard noncounting static store, or memory to which, after each measurement, the measuring value of the digital counter is transferred before the next measuring period begins and the difference determining means are connected to the outputs of the digital counter and the store. The use of static digital stores has the advantage that it is easily possible to associate a plurality of digital stores with one digital counter, which stores hold the measuring values derived during a plurality of consecutive measuring intervals, which values are used to form several difference values between the measured values for one or a plurality of previous measuring intervals in order to achieve in this manner a further effective interference suppression by mean value determination and elimination of several true echoes.

An arrangement which is advantageous from a structural as well as an operational standpoint is one in which the digital store is formed by a backward counter which receives the measured value of the forward counter as its initial value and in which both counters receive identical or corresponding counting pulses and are simultaneously started and stopped so that the final count of the backward counter can be fed to the limit value logic means as the difference value.

In addition to the fact that this reduces the expenditures for the digital counter and digital store, the digital store thus formed simultaneously constitutes the difference former so that a separate digital counter and difference former are unnecessary.

A substantial simplification in the limit value logic means can be achieved, particularly when the digital store is in the form of a second forward counter or a combined forward and backward counter, by causing the two digital counters to be started with a time lag with respect to each other and by arranging the limit value logic means to operate with a correspondingly displaced limit value range.

This limit value range can be so selected that, for example, when the counters are arranged in decades with each decade corresponding to one digit of the numerical value of the measured distance in meters, only difference values between 0 and 95 cm. are permitted, with equal or approximately equal positive as well as negative deviations, so that those decade positions to be checked must be at 0. Alternatively, the limit value range can be selected so that the permissible difference values for an indication of the measured values lie between 99,990 cm. and 99,999 cm. so that the decades to be checked must all be at 9. In both cases this results in a simplified construction of the limit value logic means.

The time lag is advantageously created by causing the first counting pulses after the starting pulse to be fed into an auxiliary counter which, after counting a certain relatively small number of counting pulses, blocks itself and opens a gate for the transfer of subsequent counting pulses into the backward counter.

Erroneous measurements due to missing echo pulses can be eliminated by a block which blocks release of the digital measuring values if no echo signal appears during a measuring interval.

The limit value range of the limit value logic means can advisably be variable. Such a variation can be utilized to achieve an adaptation to the changes in true measured values which could possibly occur from one measuring interval to the next. For this purpose, the limit value can be so controlled that it increases in dependence on the measuring time. This can be significant when the limit value range is to be adapted to the fluctuation in the measured values which occur due to rough seas and which increase with increasing depth because the increase in depth or measuring time also increases the time interval during which the changes in depth caused by the rough seas can be effective. In devices where the measuring range can be switched the limit value range is suitably switched together with this change of measuring range.

A further elimination of erroneous measurements can be achieved in that means are provided to generate two counting pulse trains whose repetition rates are a whole number ratio of $1:n$ with respect to each other and the number of lower rate pulses counted during $n$ measuring intervals is compared with the number of higher rate pulses counted during one measuring interval. In a digital store using a backward counter this can be accomplished in that the lower rate counting pulses are fed into the backward counter and the backward counter only accepts the measured value of the forward counter after each sequence of $n$ measuring intervals.

DESCRIPTION OF THE PREFERRED EMBODIMENTS

The present invention will first be described with reference to FIG. 1 which relates to a circuit for use in the echo sounding art. In an echo sounder producing echo sounding pulses, an underwater sound transmitter 1 emits sound signals S in a direction toward the sea bottom and the echo pulses E which are reflected from the sea bottom are received by a receiver 2, amplified in an amplifier 3 and rectified in a rectifier 4, all of which devices are known in the art, from where they are fed as pulses E' to a digital measuring device M which includes a digital counter whose count is terminated by a pulse E'. The travel time of the sound pulses from transmitter 1 to the bottom of the sea and back to the receiver 2 is measured by delivering a starting pulse S$t$ to device M simultaneously with the emission of each signal pulse S. This starting pulse comes from a pulse train generator 5 which actuates the transmitter 1 via a pulse generator 6, both generators also being known in the art.

The time $t$ between the occurrence of a signal pulse S, and the simultaneous starting pulse S$t$, and the echo pulse E or E', which is a measure for the sea depth, is measured by the digital measuring instrument M and the measured value is fed through the instrument output to a data store.

In order to limit the complexity, and hence the cost, of the data store 7, the data coming from the echo sounder are continuously processed in the digital measuring instrument M but the measured values are transferred to the data store 7 only from time to time. The intervals between such transfers can be selected either manually or, as is assumed for the illustrated embodiment, by a time- or position-controlled instruction generator 8 which will be described in detail below.

Figure 2:
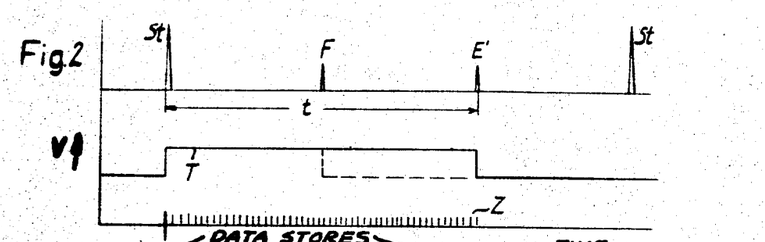
FIG. 2 is a pulse diagram illustrating the operation of the circuit of FIG. 1.

During the echo sounding operation, more or less numerous and strong interfering pulses occur during the period between the occurrence of the two pulses S$t$ and E' marking the beginning and end of a distance measuring time interval, one such interfering pulse being shown at F in FIG. 2. Such interfering pulses can result in erroneous measurements since they might cause the digital counter whose output is to represent such time interval to be stopped not by the echo pulse E' but at an earlier time by the interfering pulse F.

In the echo sounding device itself provision is already made to prevent, as much as possible, such interfering pulses from reaching the digital measuring instrument M. Such measures, however, do not form a part of the present invention and are therefore not discussed here. The object of the present invention is rather to eliminate the adverse effects of any interfering pulses which may reach the digital counter of the measuring instrument.

The digital measuring device itself will now be described in detail. This device consists of a counting pulse clock generator 9 which emits counting pulses Z at a fixed counting rate of, for example, one pulse every 60 μs., or approximately $17 \times 10^3$ pulses/sec., to an AND circuit gate 10 which also receives, via a second input, one gating pulse T during each measuring interval from a flipflop 11. Each gating pulse is initiated by a starting pulse St and terminated by the corresponding echo pulse E', each of which is applied to a respective one of the two inputs of the flipflop 11. The length of a gating pulse T thus corresponds to the time interval $t$ between a starting pulse and the corresponding echo pulse.

The arrival of a starting pulse St at the flipflop 11 causes a gating pulse T to be produced to open gate 10 and thus to permit counting pulses Z to travel to the digital counter 12 until, at the end of the gating pulse T, corresponding to the application of a pulse E' to the flipflop, gate 10 again blocks the counting pulses. The digital counter 12, called the forward counter hereinafter, usually consists of a plurality of series-connected decades 12a, 12b, 12c, each decade normally having four flipflops. The counter is arranged to produce a binary-coded decimal representation of the number of counting pulses received from the output of gate 10, with each decade being connected to transmit a respective binary-coded decimal digit to the four inputs of a respective gate 13a, 13b and 13c of a gating circuit 13, these binary-coded digits being conveyed to the decade portions 7a, 7b and 7c, respectively, of the data store 7. The gates 13a, 13b and 13c receive gate opening pulses via a line 14, the pulses being produced in a manner which will be described in detail below.

The outputs of the flipflops of counter 12 are further connected via a second gating circuit 15 having gates 15a, 15b and 15c, to the setting inputs of the decades 16a, 16b and 16c of a backward counter 16. The gating circuit 15 receives its gate opening pulses via a line 17.

The decades of the forward counter 12, as well as those of the backward counter 16, are usually connected with each other by carry lines 18 and 19. Only a few decades of the counters, gating circuits and stores have been shown in the interest of simplicity.

The forward counter 12 is reset to zero by a signal sent over a line 20 which is connected to each of the individual decades.

The counting pulses for the backward counter 16 also come from counting pulse generator 9 via gate 10 and are delivered via an auxiliary counter 21 to the counting pulse input of decade 16a, the pulses to decades 16b and 16c being conveyed by carry lines 19. The significance of the auxiliary counter 21 will be explained further below.

A limit value logic unit 22 composed of diodes is connected to the complementary, or negated, outputs of the binary-coded digit decades 16b and 16c of the backward counter 16 and controls, in a manner to be explained in detail below, the transfer of the contents of counter 12 by acting on a JK flipflop 23 to cause a gate opening signal to be sent to gating circuit 13. This JK flipflop 23 is preset by the output pulses from the instruction generator 8. The JK flipflop 23 is connected to initiate a gate opening pulse when a clock pulse appears which was initiated by the appearance of an echo E', the clock pulse being formed from the output pulse from flipflop 11 by a transistor delay circuit 24, and when, at the same time, a test pulse, representing a binary "ONE," or "L," from the limit value logic unit 22 is present on line 25.

To generate a gate opening pulse for the gating circuit 13 the output of the JK flipflop 23 is connected via a differentiating stage 26 to line 14. After transfer of the contents of a forward counter 12, which contents represent a measured time interval, into the data store 7 via the gating circuit 13, a gate opening pulse, which is derived from the echo pulse E' via the transistor delay circuit 24 and which is delayed with respect to the clock pulse for the JK flipflop 23, is delivered via line 17 to the gating circuit 15 and thus the contents of counter 12 are transferred to the setting inputs of the backward counter 16 to preset the latter. Upon completion of the transfer, the forward counter 12 is reset to zero by means of a clear pulse via line 20 which is connected to the end of the delay circuit 24.

Finally, a bolcking circuit 27 is provided which is connected to the limit value logic unit 22 and which assures that no L-signal will appear on line 25 thus inhibiting JK filipflop 23 when no echo pulse E' has appeared during a measuring interval, what is denoted by the output of the flipflop 11, which is connected via a line 29 with the blocking circuit 27 still remaining at L. The blocking circuit 27 contains a JK flipflop 28, which switches when line 29 is at L and when a starting pulse St initiates a clock pulse on line 30. The output of this JK flipflop keeps line 25 at zero, via a diode 31, after it has been switched, and is cleared by a pre-set pulse which is produced by delay circuit 24 after an echo pulse E' has appeared and which is sent via a line 32 before the forward counter 12 will be reset to zero via line 20.

Figure 11:
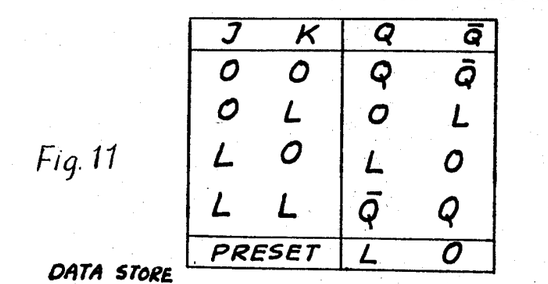
FIG. 11 is a true-table explaining the controlling of a JK flipflop.

The function of said JK flipflops 23 and 28 is explained with respect to the true-table of FIG. 11 as follows. A pre-set pulse always effects an L-signal at the associated output.

Input signals at J and K only control the JK flipflop in the case of coincidence with a clock-pulse. The effects of different input signal combinations in presence of clock pulses are detailed in the true-table of FIG. 11.

The above-mentioned auxiliary counter 21 counts the counting pulses Z coming from gate 10 in a counting stage 33 which counts only to a predetermined number after the opening of gate 10. Thereafter, the output of counting stage 33 is connected to block its own input 37 via inverter gate 34 and AND gate 36 and then gate 34 is enabled for transmitting the counting pulses Z to decade 16a of the backward counter via a line 38.

The operation of the digital measuring circuit M is as follows: After gate 10 has been opened by gating pulse T, the counting pulses Z reach the decade 12a of the forward counter, and the counter counts the counting pulses appearing during the interval of the gating pulse T in its three decade stages 12a, 12b and 12c.

Shortly after completion of the first time interval measuring count at the time of the arrival of echo E', which terminates pulse T, the measured value stored as a count in forward counter 12 is transferred from the counter, by means of the gating pulse applied to line 17 from delay circuit 24, to the backward counter 16. The forward counter is subsequently reset to zero by the clear pulse appearing on line 20 before the next starting pulse St is produced.

Before the next time measuring cycle is initiated, the forward counter 12 is at zero and the backward counter 16 contains a count representing the measured value transferred from the forward counter, which count is assumed, for purposes of the succeeding discussion, to correspond to a count of 146 pulses. With the next starting pulse St, the forward counter 12 again begins its counting process. At the same time, the auxiliary counter 21 counts up to a predetermined number of counting pulses, for example, up to the fifth counting pulse, corresponding to an acoustic pulse travel time of 300 µs. All further counting pulses Z arriving during the duration t of the gating pulse T are conveyed to the backward counter 16 via gate 34 to cause it to count down. Consequently, at the end of the present gating pulse, the backward counter 16 will not have reached zero, but only a count of "5," provided that the sea depth, and hence the duration t of the gating pulse T, have not changed so that the forward counter 12 has again reached the previous value count of "146."

Thus, with this assumption, the forward counter 12 is at "146" and the backward counter 16 at "005" when the next echo E' arrives.

That output of the decade 16a containing the value "5" might not be connected to the limit value logic unit 22 because the value "5" might have been selected to lie within the limit value logic tolerance range, which in the illustrated example is assumed to extend from 0 to 9, so first limit value logic diode being connected to the backward digital counter 16 is that diode 22a being connected to the carry line 19 of the value "10". By interconnection of a further diode 22b however, as shown in dashed lines, it is possible to further reduce the tolerance range of the limit value logic. Removal of diodes up to higher values will correspondingly enlarge the tolerance range.

The diodes are connected to the complementary outputs of the decades of the backward counter to detect the presence of an "L" (binary "1") at all of these outputs. This is the case when the backward counter, namely the decades being checked, are at zero. If this requirement is met, the signal on line 25 is an "L" and the JK flipflop 23 is thus enabled to produce a gate opening signal on line 14 to transfer the actually measured value from the forward counter 12 to data store 7. Thus, transfer to store 7 can be accomplished only when the counts associated with the two preceding measuring intervals are equal or differ by a small amount within the mentioned logic unit tolerance range. After the clock pulse from delay circuit 24, which follows an echo pulse E', is applied to the clock input of the JK flipflop 23 there can follow an instruction pulse being applied as preset pulse by instruction generator 8 to the JK flipflop 23. Disappearing L-signal on the connection line between JK flipflop 23 and transistor 26 by the capacitive coupling generates a short gating pulse on line 14 so that the transfer from counter 12 to store 7 is accomplished. A short time later, the gating pulse delivered to line 17 from the delay circuit 24 transfers the count again from the forward counter 12 to the backward counter 16 and the cyclic operation continues in the above-described manner until a new instruction pulse arrives from instruction pulse generator 8 at JK flipflop 23 to transfer the next checked result to the data store 7 in the described manner.

Every time a measuring count is transferred from the forward counter 12 to the backward counter 16, the new count is fed, in a known manner, into the backward counter 16.

The frequency at which data is fed out to store 7 is determined by the instruction pulse generator 8. This device can consist, for example, of a pulse generator which emits pulses at intervals of 10 seconds to the JK flipflop 23. The pulse sequence is selected, depending on the existing circumstances, so that, on the one hand, a sufficient amount of information reaches the data store and, on the other hand, the data storage unit is kept as small as possible.

If for the entire duration of a measuring interval no echo pulse arrives, and if echoes arrive accidentally only during every other measuring interval, the forward counter 12 continues to count until this echo arrives and there would then be the danger that the limit value logic unit 22 could check out the associated time value as being correct and would release it for transfer. In order to prevent this, the above-described blocking circuit 27 is provided which places a "0" on the output 25 of the limit value logic unit 22 if no echo whatsoever has arrived during a measuring interval.

Figures 3, 4, 5:
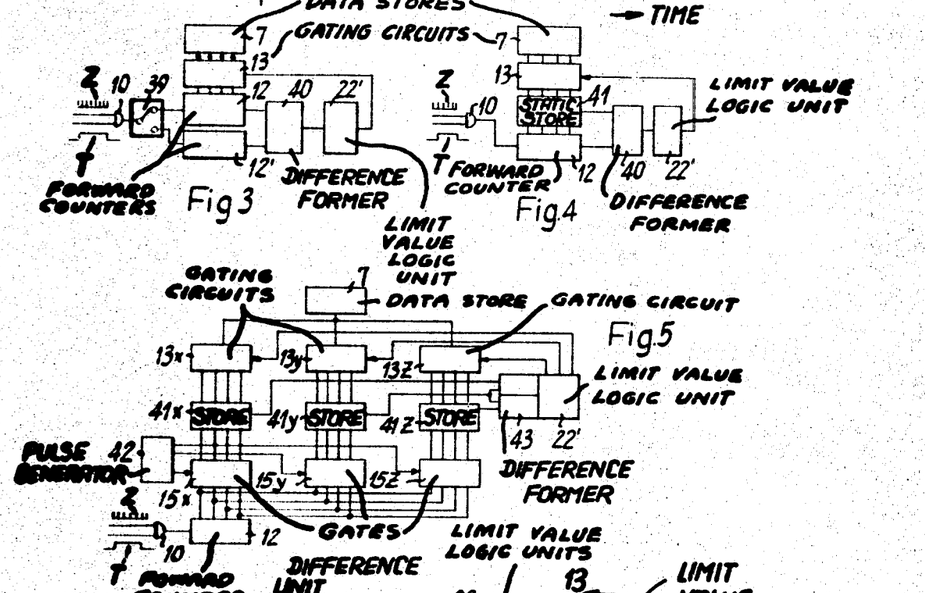
FIG. 3 is a block diagram of another embodiment of the invention.
FIG. 4 is a view similar to that of FIG. 3 showing yet another embodiment of the invention.
FIG. 5 is a view similar to that of FIG. 3 of still another embodiment of the invention.

FIG. 3 shows an embodiment of the measuring device M in which the digital store 7 is constructed as a digital counter, i.e., a normal forward counter, structurally the same as forward counter 12. Herein the counting pulse input of gate 10 is switched, from measuring interval to measuring interval, from one counter 12 to another identical counter 12' by switch 39. Each one of the two forward counters 12 and 12' retains its stored count until the end of the subsequent measuring interval, so that at the end of each measuring interval a comparison can be made between the two measured values of the counters by the connected difference former 40 and is checked by the subsequent limit value logic unit 22' which determines whether the difference between the counter counts is within a particular tolerance range and whose output signal is fed to gating circuit 13 to control the transfer of the measured value count from the forward counter 12 to the data store 7. In the embodiment illustrated in FIG. 3, it is assumed that the transfer does not occur alternatingly from the two identical forward counters 12 and 12' but rather only from forward counter 12.

FIG. 4 shows a further embodiment in which the digital store is constructed as a normal noncounting static store 41. Here, the measured value count of the digital counter 12 is transferred after each measurement, and before the start of the next measuring interval, to digital store 41 and the difference former 40 connected to the outputs of the digital counter 12 and the digital store 41, together with the subsequently connected limit value logic 22', generate the output signal to the gating circuit 13 to transfer the measuring result from the digital store 41 to the data store 7.

FIG. 5 shows a further embodiment in which a plurality of digital stores 41x, 41y and 41z are associated with a digital counter 12 to receive the measured value counts, via gates 15x, 15y and 15z whose opening is controlled by a pulse generator 42, for a plurality of consecutive measuring intervals, each store receiving the count for a respective interval. A difference former 43 is connected to these stores to determine, for example, the two differences between the measured value counts from stores 41x and 41y and from stores 41y and 41z.

A subsequent limit value logic unit 22' then determines whether the difference values are both within a predetermined tolerance range or whether both or one of the difference values fall outside of this tolerance range. Only when both difference values are within the predetermined tolerance range, will the output of the limit value logic unit 22' actuate one of the three gating circuits 13x, 13y, or 13z so that the measuring result is transferred from one of stores 41x, 41y or 41z to the data store 7.

It is here possible to construct the limit value logic unit in such a manner that it emits the release instruction through one of its three output control lines to the output of that store whose measured value count is the lowest. If, depending on the existing conditions, it is not the lowest value, but rather the mean value of the three measured value counts which is of greatest interest, the limit value logic can be arranged to effect the transfer to the data store of that count whose value is closest to this mean value.

Figure 6:
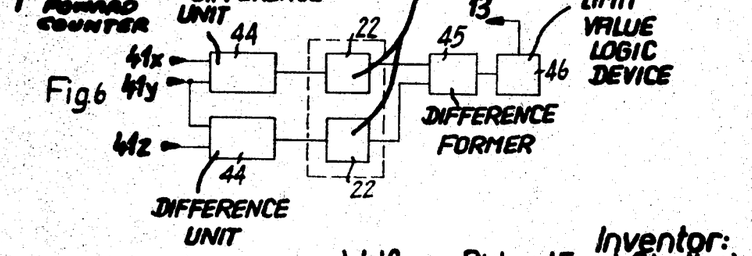
FIG. 6 is a view similar to that of FIG. 3 of a further embodiment of the invention.

It can further be of interest, during echo sounding, for example, to follow closely a genuine rapid change of the water depth, e.g., at a slope. In this case, the difference will be very high and the values will exceed the normal tolerance range for the individual differences. It is then possible to form difference values from the counts of consecutive sounding periods and to feed these to a limit value logic device. The limit value logic devices must then be divided as shown in FIG. 6, to have a first portion composed of two difference units 44 and must be so connected that it is determined in each unit of the first portion whether or not the difference between successive measuring counts falls within a tolerance range of, for example, 20 pulse counts. This is determined by the associated unit 22. If this is the case for two successive differences, their difference is formed in a further difference former 45 and in the second portion 46 of the limit value logic device which portion measures a smaller tolerance range, e.g., 5 pulse counts, it is determined whether or not the derived difference from unit 45 is within this smaller tolerance. The logic units 44 thus check whether or not the first two difference values are within a large tolerance range, which is given for the above-mentioned example of a quickly changing depth, and in the subsequent difference former 45 the difference value is then formed from these two differences and is checked in the second portion of the limit value logic 46 in such a manner that, if the two first difference values within the predetermined wider tolerance region are approximately identical and are either both positive or both negative, the transfer of one of the three measured values to the data store is initiated.

The pulse generator 42 of FIG. 5 can here determine which measuring result is to be transferred to data store 7. Preferably this will be the last measuring result.

A circuit employing the arrangement of FIG. 6 in place of units 43 and 22' of FIG. 5, with the output of unit 46 connected to that gating circuit which is to deliver data to store 7, makes possible, as can be readily appreciated, an improved and more versatile adaptation to the conditions existing during echo sounding, and particularly an improved adaptation to the form of the sea bottom. It is also possible, for example, when searching for shipwrecks, to use the circuits according to FIGS. 5 and 6 because, here too, there will occur a sudden change in the measured depth which will be maintained over several sounding cycles. Such a device is also useful when passing over dredging channels.

A quite often substantial improvement in interference elimination can be achieved if a device is provided to produce two counting pulse sequences whose rates are a whole-number ratio of 1:n to each other and which operate in such a manner that the mean value of the lower rate pulses counted over $n$ measuring intervals is compared with the measured value of the higher rate pulses counted during one measuring interval.

Figure 7:
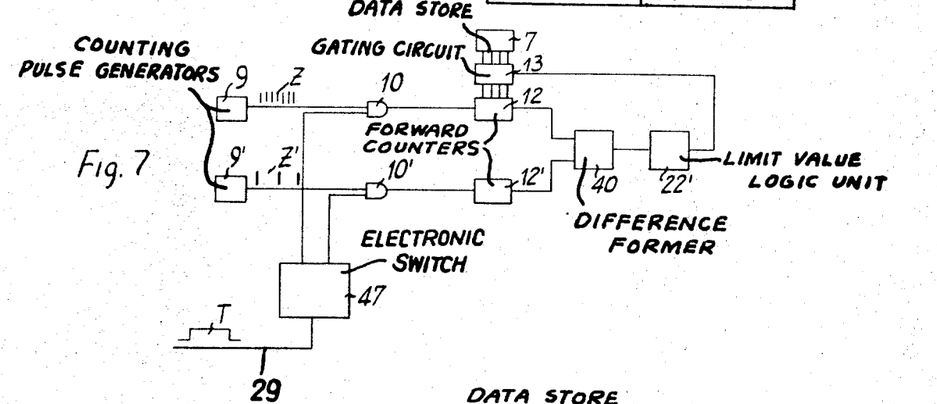
FIG. 7 is a view similar to that of FIG. 3 of yet a further embodiment of the invention.

A simplified block circuit diagram for an embodiment of this type is shown in FIG. 7, in connection with two forward counters 12 and 12' (compare FIG. 3). A first counting pulse generator 9 emits counting pulses Z at a high rate and these pulses are conveyed via a gate 10 to the first forward counter 12, and a second counting pulse generator 9' produces counting pulses Z' at a rate which is lower than for example, one third, that of pulses Z. The pulses from generator 9' are delivered via a separate gate 10' to the forward counter 12'. During the times of occurrence $t$ of the gating pulse T over three consecutive measuring intervals the forward counter 12' counts as high as does the forward counter 12 during a single measuring interval if the gating pulse T enables gate 10 for the forward counter 12 only for the duration of one measuring interval and enables gate 10' for three consecutive measuring intervals. This is effected by a suitable electronic switch 47.

The forward counter 12 holds its measured value for one measuring interval, e.g. a measuring value of 150 count pulses, until three measuring intervals are completed and at the end of these three measuring intervals the measured values in the two forward counters 12 and 12' are compared in the difference former 40 and the difference value is used, if found acceptable by the limit value logic unit 22', to control the gating circuit output 13 which transfers the measured value of 150 from the forward counter 12 to the data store 7.

Figure 1:
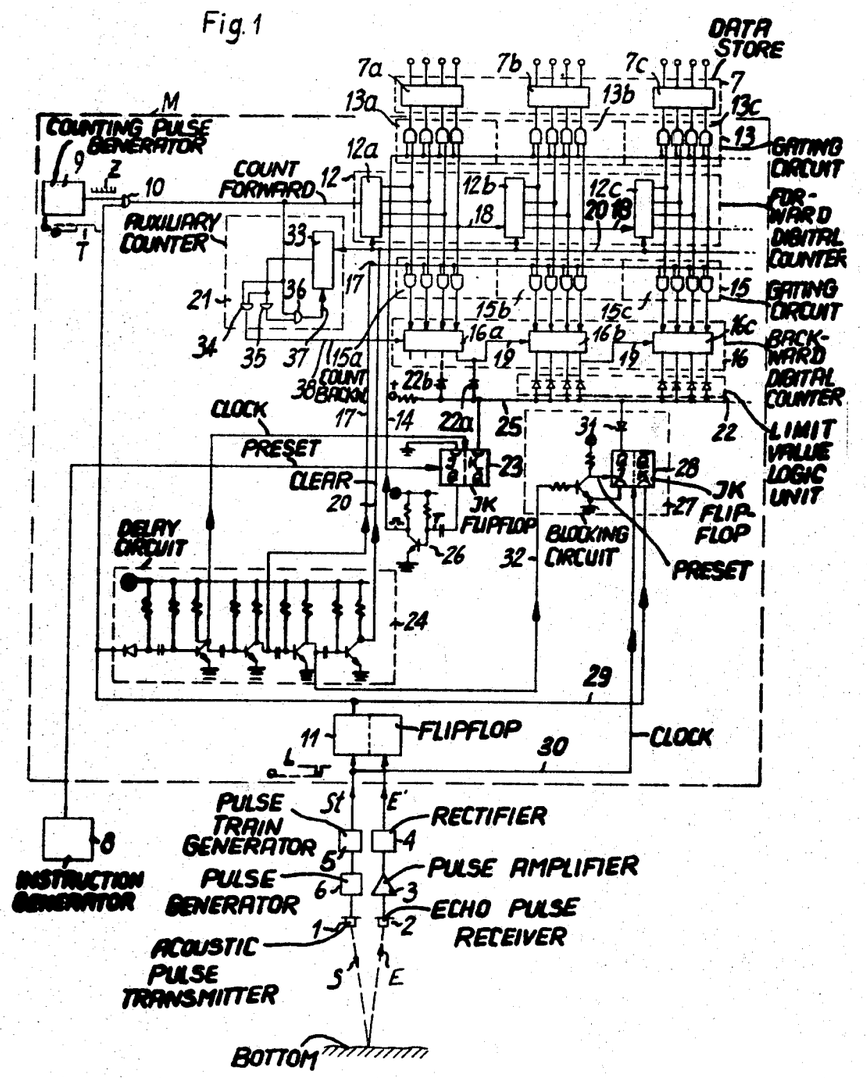
FIG. 1 is a schematic circuit diagram of a device according to the invention used with an echo sounder.
Figure 8:
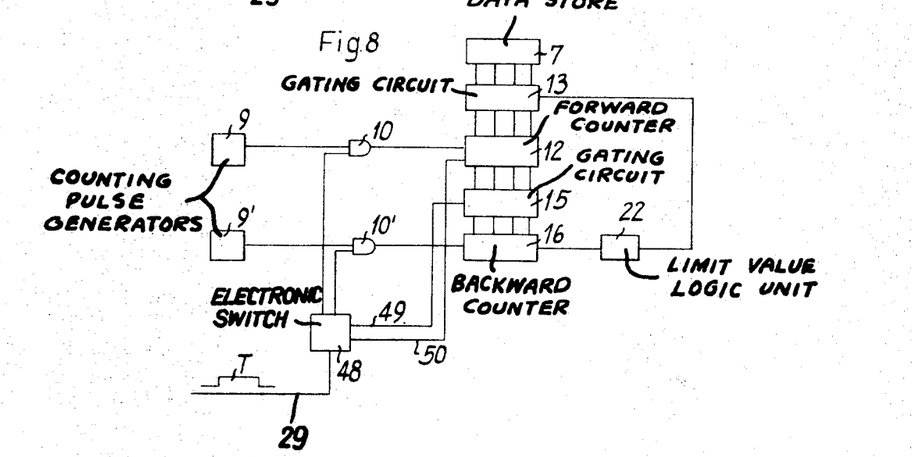
FIG. 8 is a view similar to that of FIG. 3 of a still further embodiment of the invention.

The same result can also be accomplished with an arrangement similar to that of FIG. 1, as is shown in FIG. 8. Here, an electronic switch 48 is provided which transfers the faster counting pulses from counting pulse generator 9, via gate 10, to the forward counter 12 during the ocurrence of each gating pulse T over consecutive measuring intervals. After the measuring results, e.g. 150, has been transferred from the forward counter 12, via the gating circuit 15 controlled by the electronic switch 48, to the backward counter 16 at the end of a first measuring period, such transfer is suppressed at the ends of the next two measuring intervals, and is not repeated until the end of the next three measuring intervals, after the difference value then present in the backward counter 16, which counts down in response to pulses from generator 9' during three measuring intervals after the transfer from counter 12, has first been checked at the end of the third interval by the connected limit value logic unit 22.

This difference value is sufficiently close to zero when the gating pulses T were of substantially equal lengths during consecutive measuring intervals, and the limit value logic unit 22 determines whether the difference between the fast counting pulses during one measuring interval and the sum of the slow counting pulses during three consecutive measuring intervals are within the predetermined tolerance range. If this is the case, the limit value logic unit transfers the measured value count present in the forward counter 12, at the end of the fourth measuring interval from the start, via the gating circuit 13 to the data store 7.

Switch 48 emits a transfer pulse via a line 49 to the transfer gating circuit 15 at the end of every third measuring interval and an erase pulse via a line 50 to the forward counter 12 at the end of each measuring interval.

A number of modifications and other embodiments are possible within the framework of this invention. In particular, the present invention can also be applied for measuring distances with the aid of electromagnetic waves. Quite generally, the present invention can be applied wherever short-interval measurements are subject to pulses which can shorten the measuring time interval.

All of the elements and units shown in the figures can be constituted by well-known circuits. Means for varying the tolerance range of said logic means in accordance with the length of the measuring intervals are detailed in FIG. 9.

Figure 9:
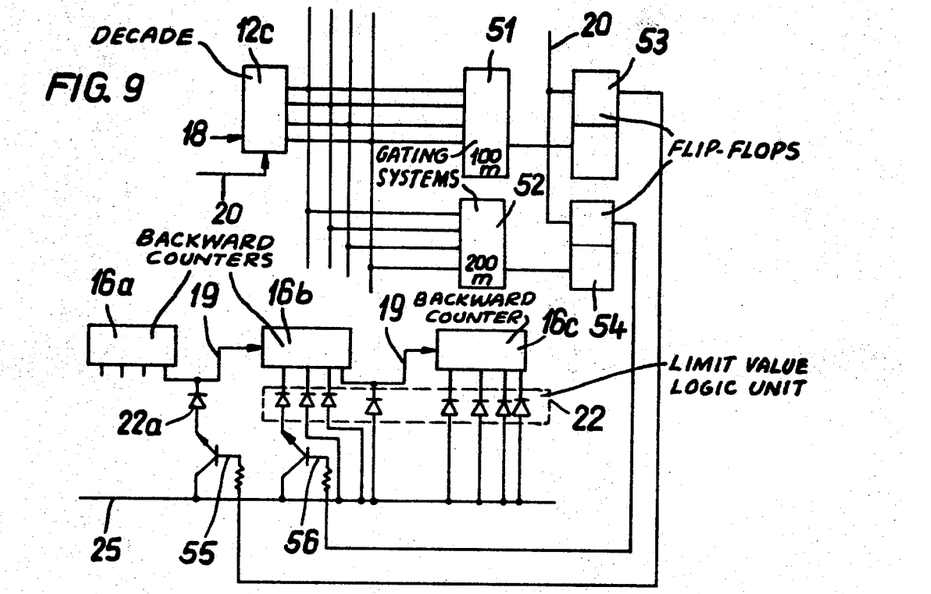
FIG. 9 is a schematic circuit diagram of a device automatically switching the tolerance range in accordance with the length of the measuring intervals.

The outputs of decade 12c of the forward counter 12 are connected to, e.g., two systems 51 and 52 of gates, not shown in detail, so-called binary decoder matrices known per se. These systems 51 and 52 deliver output signals as soon as the forward counter 12 reaches the corresponding number, e.g., according to 100 meters and 200 meters respectively. Each of these output signals set one associated flipflop 53 and 54 respectively. Reset of flipflops 53 and 54 is effected by the clear pulse via line 20. Output signals from the flipflops 53 and 54 are connected to switching transistors 55 and 56 respectively, both being interconnected between line 25 and diode 22a and the first diode out of the series of diodes of the limit value logic unit 22.

The switching transistors 55 and 56 are conducting when having L-potential at their base and nonconducting when having 0-potential at the base.

Thus the tolerance range is enlarged in accordance with the length of the measuring intervals and is reset to the original size by each clear pulse via line 20.

Figure 10:
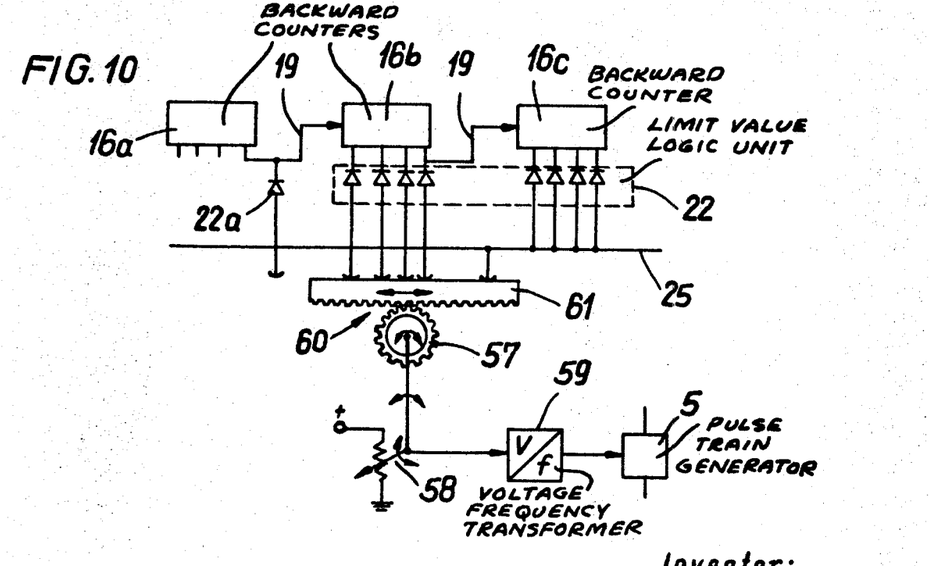
FIG. 10 is a schematic diagram of a device switching the tolerance range simultaneously with the switching of the measuring range.

FIG. 10 shows an embodiment in which the apparatus is arranged to be switched to operate at different measuring ranges and said logic means is arranged to have its tolerance range varied simultaneously with the switching of the measuring range. A mechanical switch 57 is connected with a potentiometer 58 delivering a voltage proportional to the measuring range selected. This voltage is transformed by a voltage-frequency-transformer 59 to an alternating signal with a frequency proportional to the measuring range selected. This alternating signal is triggering the pulse train generator 5. On the other hand the mechanical switch 57 actuates by means of a rack-and-pinion gear 60 a contact bar 61. This contact bar 61, in every position being connected to line 25, is connecting to the latter more or less of the diodes mentioned above.

It will be understood that the above description of the present invention is susceptible to various modifications, changes and adaptations.

I claim:

1. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
    (a) difference determining means associated with said counter for determining the difference between the count which it reaches during one measuring interval and the count occurring during a different interval;
    (b) limit value logic means for permitting the transfer of the count reached by said counter to an output store only when such difference is within a predetermined tolerance range; and
    (c) two forward counters and switching means connected between said pulse generator and said counters for delivering pulses to only one of said counters during one measuring interval and to only the other one of said counters during the next succeeding measuring interval, wherein said difference determining means are connected to both of said counters for determining the difference between their stored counts at the end of each measuring interval, said limit value logic means being connected to control only one of said counters.

2. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
    (a) difference determining means associated with said counter for determining the difference between the count which it reaches during one measuring interval and the count occurring during a different interval;
    (b) limit value logic means for permitting the transfer of the count reached by said counter to an output store only when such difference is within a predetermined tolerance range;
    (c) temporary storage means arranged for receiving and storing the value reached by said counter at the end of each measuring interval, wherein said storage means are constituted by a non-counting static memory; and
    (d) means for transferring the output of said counter to said memory between the end of one measuring interval and the beginning of the next succeeding measuring interval, wherein said difference determining means are connected to said memory and said counter for determining the difference between the count stored in said memory and that stored in said counter at the end of a measuring interval.

3. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
    (a) difference determining means associated with said counter for determining the difference between the count which it reaches during one measuring interval and the count occurring during a different interval;
    (b) limit value logic means for permitting the transfer of the count reached by said counter to an output store only when such difference is within a predetermined tolerance range;
    (c) a plurality of temporary storage means arranged for receiving and storing the value reached by said counter at the end of each measuring interval; and
    (d) control means connected between said counter and said storage means for transferring to each said storage means the count reached by said counter during a respective measuring interval.

4. An arrangement as defined in claim 3 wherein said difference determining means are connected to all of said storage means for determining the differences between the counts stored in each pair of storage means.

5. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
    (a) difference determining means associated with said counter for determining the difference between the count which it reaches during one measuring interval and the count occurring during a different interval;
    (b) limit value logic means for permitting the transfer of the count reached by said counter to an output store only when such difference is within a predetermined tolerance range, temporary storage means arranged for receiving and storing the value reached by said counter at the end of each measuring interval, wherein said temporary storage means and said difference determining means are constituted by a backward counter which is connected to said forward counter to receive, as a starting count, the count stored in said forward counter during the preceding measuring interval, both of said counters being connected to receive pulses from said pulse generator at the start of the next measuring interval and the output of said backward counter being delivered to said limit value logic means as a difference signal; and
    (c) delay means connected between said pulse generator and said backward counter for delaying the start of transmission of pulses from said generator to said backward counter with respect to the start of transmission of such pulses to said forward counter, wherein the predetermined tolerance range of said logic means are adjusted to correspond with the number of pulses occurring during the time of such delay, wherein said delay means comprise an auxiliary counter connected to said pulse generator for counting a predetermined number of pulses and then blocking its own input, and gate means connected between said pulse generator and said backward counter and associated with said auxiliary counter for conveying pulses from said pulse generator to said backward counter after said auxiliary counter has reached its predetermined count.

6. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
  (a) difference determining means associated with said counter for determining the difference between the count which it reaches during one measuring interval and the count occurring during a different interval;
  (b) limit value logic means for permitting the transfer of the count reached by said counter to an output store only when such difference is within a predetermined tolerance range;
  (c) a second pulse generator producing pulses at a rate of $1/n$ times the pulse rate produced by said first-mentioned counting pulse generator, wherein $n$ is an integer, a second forward counter connected to receive pulses from said second pulse generator; and
  (d) control means operatively associated with said counters for causing said first-mentioned counter to count the pulses received from its associated generator during one measuring interval and for causing said second counter to count the number of pulses received from said second pulse generator during $n$ measuring intervals, said difference determining means being connected to both of said counters for determining the difference between their counts at the end of every $n$ measuring intervals.

7. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
  (a) difference determining means associated with said counter for determining the difference between the count which it reaches during one measuring interval and the count occurring during a different interval;
  (b) limit value logic means for permitting the transfer of the count reached by said counter to an output store only when such difference is within a predetermined tolerance range; and
  (c) a second pulse generator producing pulses at a rate which is equal to $1/n$ times the pulse repetition rate of said first-mentioned pulse generator, where $n$ is an integer, wherein said difference determining means comprise a backward counter connected to receive, as a starting count, the count stored in said forward counter at the end of one measuring interval and the count number of pulses received from said second pulse generator during the next $n$ measuring intervals, the count reached by said backward counter at the end of such $n$ intervals representing the difference between the count transferred from said forward counter and the number of pulses counted by said backward counter.

8. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
  (a) difference determining means associated with said counter for determining the difference between the count which it reaches during one measuring interval and the count occurring during a different interval; and
  (b) limit value logic means for permitting the transfer of the count reached by said counter to an output store only when such difference is within a predetermined tolerance range, wherein said logic means includes means for permitting its tolerance range to be varied in accordance with the length of the measuring intervals.

9. In range measuring apparatus for digitally measuring the time intervals between transmission of ranging signals and their reception after reflection from a surface whose distance is to be determined, which apparatus includes a counting pulse generator, a forward counter for counting such pulses, and control means for producing a start pulse to start the counter at the beginning of a measuring interval and a stop pulse for terminating the transmission of pulses to the counter upon arrival of a signal indicating the end of a measuring interval, the improvement comprising:
  (a) difference determining means associated with said counter for determining the difference between the count which it reaches during one measuring interval and the count occurring during a different interval;
  (b) limit value logic means for permitting the transfer of the count reached by said counter to an output store only when such difference is within a predetermined tolerance range; and
  (c) means connected for permitting said apparatus to be switched to operate at different measuring ranges and the tolerance range of said logic means is variable and is arranged to be varied simultaneously with the switching of the measuring range.

References Cited
UNITED STATES PATENTS

| | | | |
|---|---|---|---|
| 3,035,263 | 5/1962 | Lader et al. | 343—7.3 |
| 3,344,421 | 9/1967 | Dildy | 343—7.3 |

RICHARD A. FARLEY, Primary Examiner

U.S. Cl. X.R.

343—7.3, 13